US005641032A

United States Patent [19]
Whitman

[11] Patent Number: 5,641,032
[45] Date of Patent: Jun. 24, 1997

[54] ANTI-THEFT SYSTEM FOR A VEHICLE

[76] Inventor: John B. Whitman, Rte. 3, Box 5300, Crawfordville, Fla. 32327

[21] Appl. No.: 267,276

[22] Filed: Jun. 28, 1994

Related U.S. Application Data

[63] Continuation-in-part of Ser. No. 82,796, Jun. 28, 1993, Pat. No. 5,351,781.

[51] Int. Cl.[6] .................................................. B60R 25/00
[52] U.S. Cl. ........................... 180/287; 188/353; 303/89
[58] Field of Search .............................. 180/287; 303/89; 188/353, 265; 307/10.2; 70/237, 256, 277

[56] References Cited

U.S. PATENT DOCUMENTS

| | | | |
|---|---|---|---|
| 3,617,663 | 11/1971 | Whittemore | 188/353 |
| 4,495,910 | 1/1985 | Taylor | 180/287 |
| 4,678,068 | 7/1987 | Matthews et al. | 303/89 |
| 4,721,192 | 1/1988 | Cano et al. | 180/287 |
| 4,951,776 | 8/1990 | Leter | 180/287 |
| 4,964,677 | 10/1990 | Splinter | 303/89 |
| 5,163,741 | 11/1992 | Hsiu | 303/89 |
| 5,392,876 | 2/1995 | Linares | 188/353 X |

FOREIGN PATENT DOCUMENTS

| | | | |
|---|---|---|---|
| 0484715 | 7/1955 | Canada | 188/353 |
| 2195005 | 3/1988 | United Kingdom | 303/89 |

*Primary Examiner*—Eric D. Culbreth
*Assistant Examiner*—Christopher Ellis
*Attorney, Agent, or Firm*—Carnes, Cona, and Dixon

[57] ABSTRACT

The present invention provides for an anti-theft system which is located within a fluid line. This anti-theft system will control the directional flow of the hydraulic fluid in the fluid line. The system of the present invention includes a control panel and a blockage means. The control panel permits for an authorized person to activate or deactivate the anti-theft system. Upon activation or deactivation, a signal is transmitted to a motor via an electrical cable. The motor will activate or deactivate the blocking means.

5 Claims, 11 Drawing Sheets

ANTI-THEFT SYSTEM FOR A VEHICLE

This is a continuation-in-part of application Ser. No. 08/082,796 filed Jun. 28, 1993, now U.S. Pat. No. 5,351,781.

BACKGROUND OF THE INVENTION

Auto theft is a problem in the United States reaching epidemic proportions. Auto theft costs the American public countless dollars in damages. Vehicles are stolen and shipped off to remote destinations to be resold or taken to "chop shops" to be striped to their parts and then the parts are resold. Other vehicles are stolen by thrill seekers to be used for joy riding and thereafter the vehicle set ablaze or otherwise severely damaged to destroy any evidence of the identity of the thief.

Many anti-theft devices have been conceived in order to combat this serious problem. However, none of the anti-theft device conceived to date have the particular combination of features as the anti-theft system of the present invention.

Many common devices make use of sensors to detect either door openings or car vibrations. Upon detection of an adverse event, these devices attract attention to the compromised vehicle by making noise such as sounding an alarm or the vehicle's horn, and flashing the lights of the vehicle. This noise being intended to frighten the would-be thief away.

Other anti-theft devices are designed to forcefully lock the steering mechanism into place thereby preventing the vehicle from being operative. These anti-theft devices, although having some effect, are easily by-passable by an enterprising thief.

Anti-theft devices which draw attention to the vehicle can be defeated simply by disconnecting the power source of the alarm by disconnecting the cars battery. Thereafter, the alarm can be disconnected or the horn disabled and the thief is free to reconnect the battery and pursue his craft.

The proliferation of false alarms has made the public largely immune to the noise generated from these alarms thereby permitting the thief to accomplish his task with minimal attention.

The steering disabling device as well as the noise making device are unable to prevent the vehicle from being towed away. A thief can simply arrive by tow truck, pick up his intended booty and haul it off rendering the above theft prevention devices impotent.

The present invention overcomes the above short comings. The present invention is designed to set the vehicles brakes into a locked position thereby making the vehicle impossible to drive or tow.

SUMMARY OF THE INVENTION

The present invention provides for an anti-theft system which is located within a fluid line. This anti-theft system will control the directional flow of the hydraulic fluid in a fluid line. The system of the present invention includes a control panel and a blockage means.

The control panel permits for an authorized person to activate or deactivate the anti-theft system. Upon activation or deactivation, a signal is transmitted to a motor via an electrical cable.

The motor is exteriorly attached to a housing. This housing shelters the blocking means. The shaft of the motor extends into the housing and is rotatably and centrally attached to the blocking means. The rotation of the shaft provides for the activation or deactivation of the system.

The blocking means, when the system is activated, provides for at least one fluid line, having check valves located therein, to be aligned with the existing fluid line or lines. The check valve or valves control the direction in which the fluid can flow.

The system of the present invention can be rectofitted into any existing hydraulic fluid line. For example, the system can be fitted within the steering system of a vehicle. This will provide for a housing having one fluid line with a check valve located therein to be situated between the power steering pump and the power steering unit. This configuration will enable the fluid to flow freely between the power steering pump and the power steering unit when the system is inactive. Upon activation, the fluid line of the blocking means become aligned with the hydraulic line between the power steering pump and the power steering unit. This will provide for the fluid to flow solely to the power steering pump and not have it return to power steering unit, thereby disabling the operation of the steering wheel.

In a second example, the system can be fitted within the braking system of a vehicle. This will provide for a housing to have two fluid lines with check valves located therein. The housing is situated between the master cylinder and the proportioning valve. This configuration will enable the fluid to flow freely between the master cylinder and the proportioning valve when the system is inactive. Upon activation, the fluid lines of the blockage means become align with the hydraulic lines which are between the master cylinder and the proportioning valve. This arrangement provides for the fluid to flow to the proportioning valve and not return to the master cylinder, thus disabling the operation of the brakes.

Therefore it is the object of the present invention to create an anti-theft system for a vehicle whereby the system renders the vehicle non-operational and non-towable.

It is another object of the present invention to create an anti-theft system for a vehicle which is relatively inexpensive to manufacture and install.

It is another object of the present invention to create an anti-theft system for a vehicle that can only be disabled by authorized personnel and that will not engage the vehicles brakes during a catastrophic power loss during normal vehicle operation.

BRIEF DESCRIPTION OF THE DRAWINGS

Similar reference numerals refer to similar parts throughout the several views of the drawings.

DESCRIPTION OF THE PREFERRED EMBODIMENTS

Figure 1A:
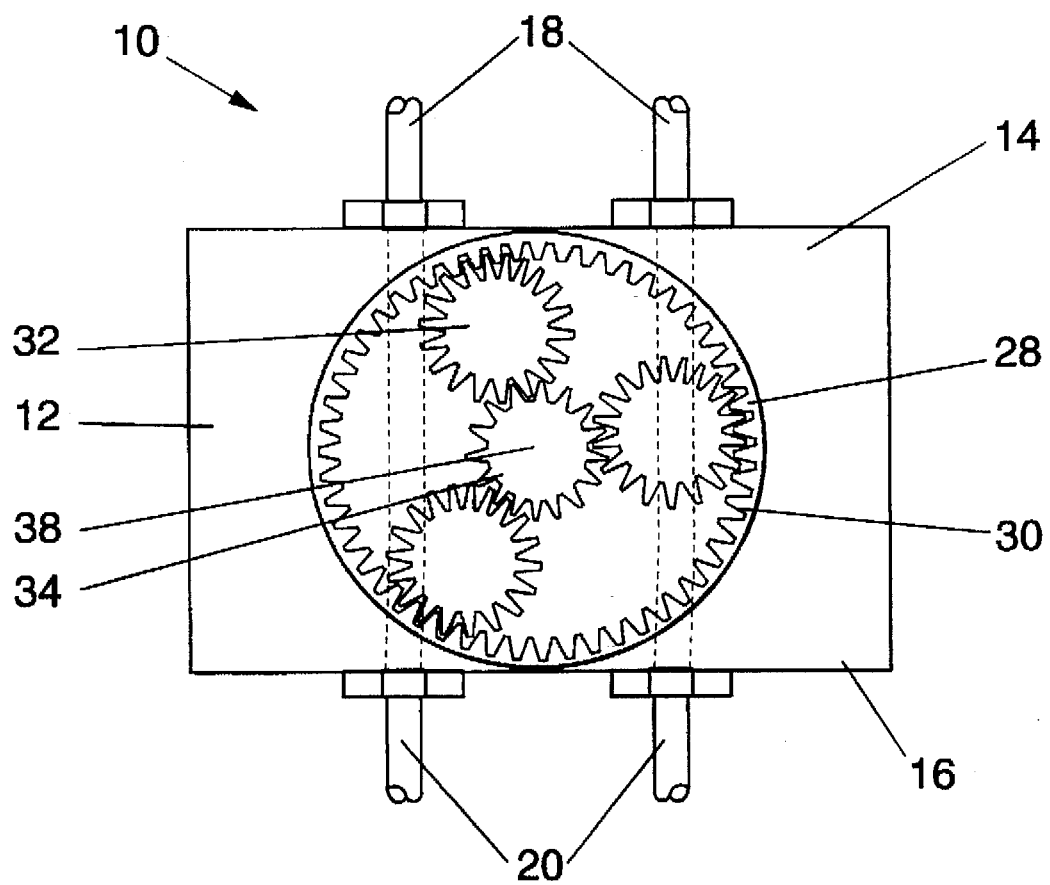
FIG. 1a is a partial cut-away view of the first embodiment of the anti-thief system of the present invention.

It is noted that FIGS. 1–5b illustrate the installment of the present invention between the hydraulic fluid line of the braking system. Thereby, the installment occurs between the master cylinder and the proportioning valve. It is noted that this system can also be adjusted so that it can be installed within any fluid line, such as the power steering unit, wherein the blockage would occur between the power steering pump and the power steering unit.

FIGS. 1a–1d illustrate the various views of the first embodiment of the anti-thief system 10 of the present invention. In these figures, the anti-thief device is shown to be in a closed position. The anti-thief system 10 of the present invention consists of a housing 12 located between the hydraulic fluid line of the braking system. Thereby the anti-theft device is located between the master cylinder and the proportioning valve (neither illustrated). The housing has a first end 14 and a second end 16. A first set of brake lines 18 connect the first end of the housing to the master cylinder while a second set of brake lines 20 connect the second end of the housing to the proportioning valve.

Rotatably attached to the interior of the housing is a hollow cylinder 22. The hollow cylinder has a first end 24, a second end 26, and an encompassing side wall 28. A ring gear 30 is internally attached to the encompassing side wall of the hollow cylinder. A plurality of planetary gears 32 are in contact with the ring gear. A sun gear 34 is internally attached to the first end of the hollow cylinder. This sun gear is in direct contact with the plurality of planetary gears. Centrally, mechanically, and electrically attached to the sun gear is the shaft 38 of a reversible drive motor 36.

The reversible drive motor includes a top area 40 and a bottom area 42. Additionally, the reversible drive motor is connected by electrical conduits to a control panel. The control panel is locatable within the vehicle compartment. The control panel is illustrated and discussed in further detail in FIGS. 6a–6e.

A cam 132 is centrally attached to the shaft of the reversible drive motor and is located between the sun gear and the housing. A first limit switch 130a is located in the proximity of the top area of the motor while a second limit switch 130b is located in the proximity of the bottom area of the motor. The first and second limit switches are in electrical communication with the reversible drive motor.

A first fluid line 44 and a second fluid line 46 extend across the hollow cylinder. The first fluid line is parallel to the second fluid line. A first fluid channel 48 extends across the hollow cylinder and is perpendicular to the first and second fluid lines. A second fluid channel 50 extends across the hollow cylinder and is perpendicular to the first and second fluid lines. The first fluid channel is parallel to the second fluid channel. A first check valve 52 is located in the first fluid channel and a second check valve 54 is located in the second fluid channel. Therefore, when the safety device is not activated, the first fluid line and the second fluid line are aligned with the first and second brake lines (not illustrated in these figures). When the safety device is activated, the first fluid channel and the second fluid channel are aligned with first and second brake lines. Since the check valves are located in the first and second fluid channels, the brake fluid can only travel in one direction. With this configuration, the brake fluid cannot flow to the master cylinder, thereby making the brakes inoperable. This arrangement is illustrated in FIG. 1c.

The system is in an open position when the first and second fluid lines in the hollow cylinder are aligned with the first set of fluid lines to the master cylinder and to the second set of fluid lines to the proportioning valve. When the system is in an open position it can then be activated. In order to activate the system, an authorized person depresses the brake pedal of a motor vehicle. This causes pressurization throughout the brakes hydraulic lines. The person will then arm the system through the control panel. The activation means on the control panel (illustrated in FIG. 2) sends an activate signal through the electrical conduits to the reversible drive motor.

The motor will then be activated causing the shaft to rotate the sun gear. The rotation of the sun gear inherently causes the planetary gears to rotate about the sun gear. The rotation of the planetary gears against the ring gear provides for the hollow cylinder to rotate. The rotation continues until the cam contacts the first limit switch. Upon contact, the first limit switch sends a signal to the motor. This signal will provide for the motor to stop and thereby cause the first and second check valves in the third and fourth fluid lines to be aligned with the first set of fluid lines to the master cylinder and to the second set of fluid lines to the proportioning valve. The check valves permit the brake fluid to flow in one direction through the third and fourth fluid lines. This will prevent the brake fluid from returning to the master cylinder causing the brakes to be inoperable. The system will remain in this stab state irrespective of the continuation of the system electrical power.

The control panel 58 will permit for an authorized person to disarm the system. The control panel (illustrated in FIG. 2) is connected by an electrical conduit 56 to the reversible drive motor. This control panel is electrically connected to an ignition switch 60 and is locatable within the vehicle compartment. The control panel will send a deactivate signal through the electrical conduits to motor. The signal will permit the shaft of the motor to rotate in a reverse direction. This reverse rotation will provide for the sun gear to rotate in a reverse direction. The planetary gears rotate in the reverse direction due to its contact with the sun gear. The reverse rotation of the planetary gears causes the hollow cylinder to rotate via the ring gear. The rotation continues until the cam contacts the second limit switch. Upon contact, the second limit switch sends a signal to the motor. This signal will provide for the motor to stop and thereby cause the first and second fluid lines to be aligned with the first set of fluid lines to the master cylinder and to the second set of fluid lines to the proportioning valve. This alignment will permit the brake fluid to return to the master cylinder, thereby providing for normal brake operation.

A visual means, such as LEDs 62 (see FIG. 2), can be utilized on the control panel to indicate if the system is activated or deactivated. An audible means (not illustrated) can also be utilized with the control panel.

It is noted that in the first embodiment of the present invention that the blocking means consists of the cylinder, the third fluid line, the fourth fluid line, the ring gear, the planetary gears, and the sun gear.

Figure 3:
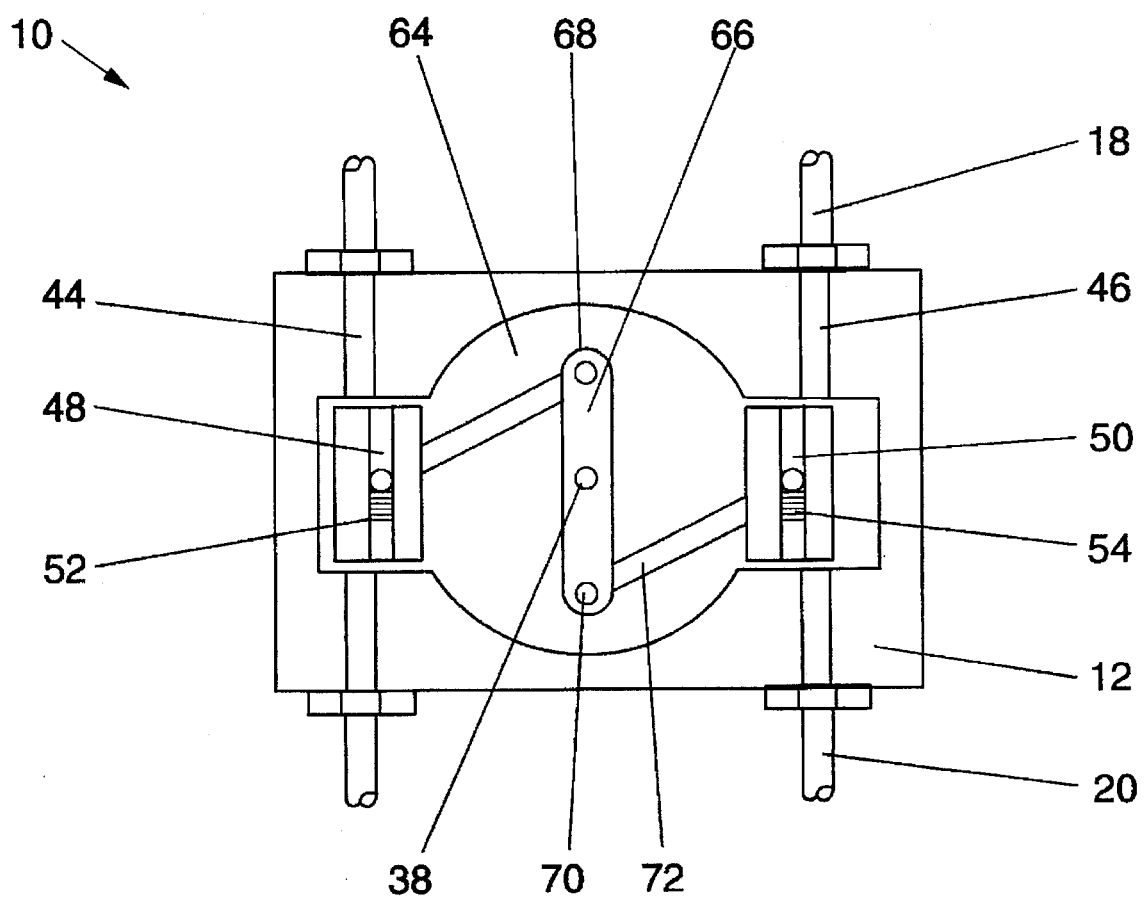
FIG. 3 is a cross-sectional view of the second embodiment of the anti-thief system of the present invention.
Figure 4:
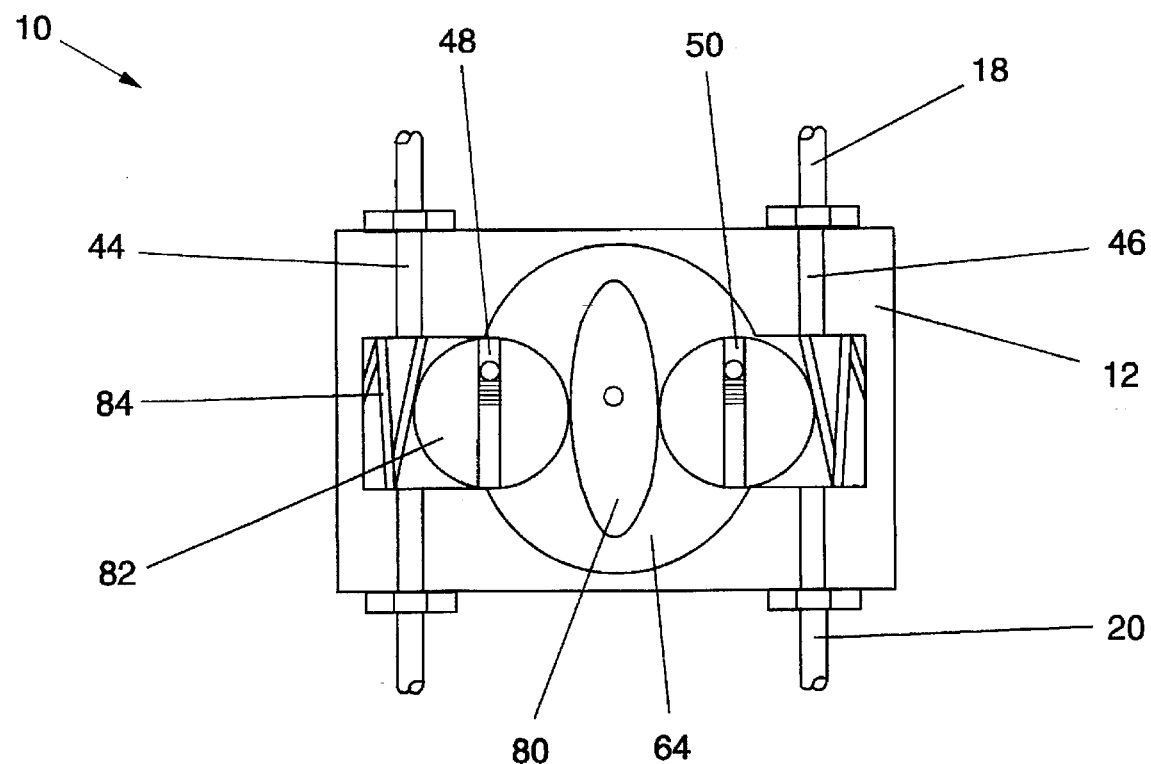
FIG. 4 is a cross-sectional view of the third embodiment of the anti-thief system of the present invention.

A second embodiment of the present invention is illustrated in FIG. 3. The anti-theft device shown in this figure is in an open position. The second embodiment of the anti-theft system 10 of the present invention consists of a housing 12 located between the master cylinder and the proportioning valve (neither illustrated). The housing 12 has a first end 14 and a second end 16. A first set of brake lines 14 connect the first end 14 of the housing to the master cylinder while a second set of brake lines 16 connect the second end 16 of the housing to the proportioning valve.

The housing includes a hollow interior 64. A first fluid line or channel 44 and a second fluid line or channel 46 are located within the housing. The first fluid line is parallel to the second fluid line and both are aligned with the first set of brake lines and the second set of brake lines. A reversible drive motor is exteriorly attached to the housing while the shaft 38 of the motor extends into the hollow interior of the housing.

The reversible drive motor includes a top area 40 and a bottom area 42. Additionally, the reversible drive motor is connected by electrical conduits to a control panel. The control panel is locatable within the vehicle compartment. The control panel is illustrated and discussed in further detail in FIG. 2.

Figure 1B:
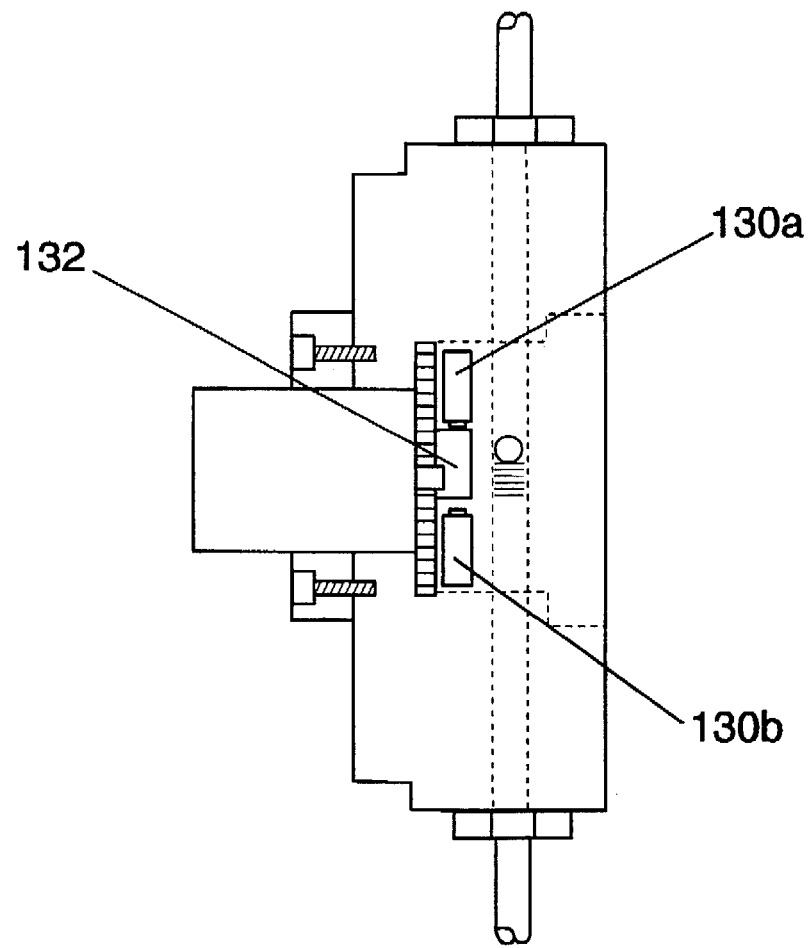
FIG. 1b is a side view of the first embodiment of the anti-thief system of the present invention.
Figure 1C:
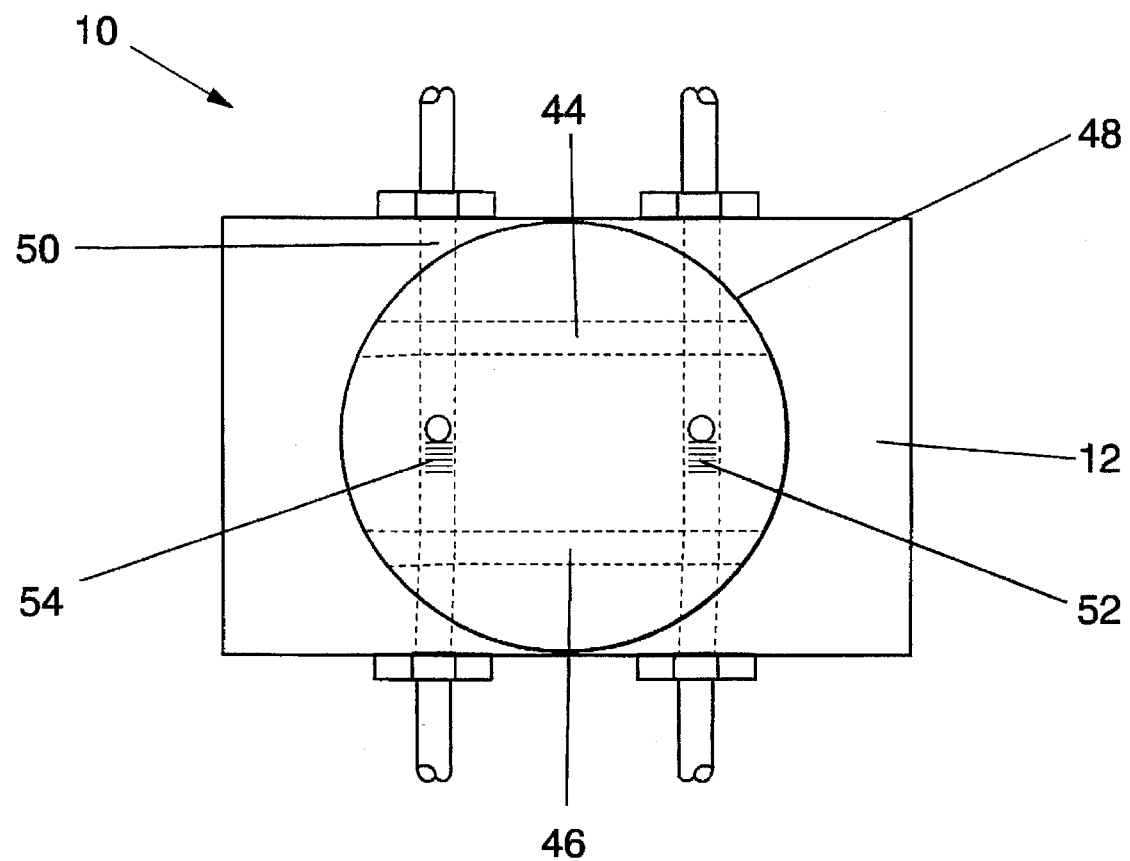
FIG. 1c is a partial cut-away rear view of the first embodiment of the anti-thief system of the present invention.
Figure 1D:
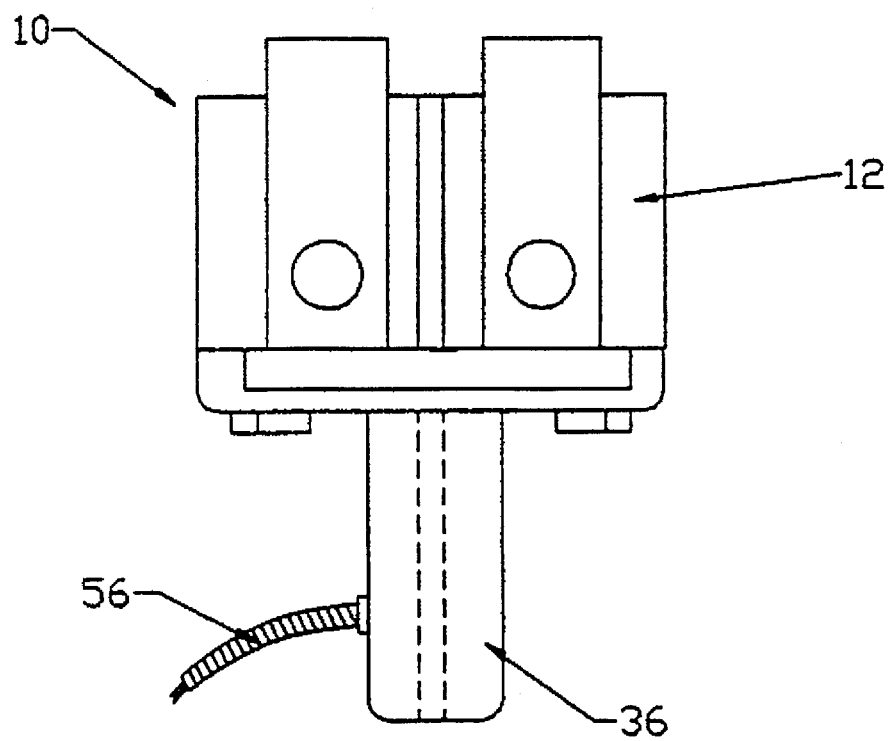
FIG. 1d is a top planar view of the housing attached to a motor used in the anti-thief system of the present invention.

A cam, not illustrated in this figure, but illustrated as 132 in FIG. 1b is centrally attached to the shaft of the reversible drive motor and is located between the sun and the housing. A first limit switch, not illustrated in this figure, but illustrated as 130a in FIG. 1b is located in the proximity of the top area of the motor while a second limit switch, not illustrated in this figure, but illustrated in as 130b in FIG. 1b is located in the proximity of the bottom area of the motor. The first and second limit switches are in electrical communication with the reversible motor.

Rotatably and centrally affixed to the shaft is a cross-bar 66. The cross-bar includes a first end 68 and a second end 70. A first rod 72 is pivotally attached to the first end of the cross-bar while a second rod 74 is pivotally attached to the second end of the cross-bar. The first rod is attached at its opposite end to a first piston 76 and the second rod is attached at its opposite end to a second piston 78. A third fluid line or fluid channel 48 is located in the first piston and a fourth fluid line or fluid channel 50 is located in the second piston. A first check valve 52 is situated inside the third fluid line and a second check valve 54 is situated inside the fourth fluid line. Though not illustrated, a cam is centrally attached to the shaft of the motor and between the cross-bar and housing.

The system is in an open position when the first and second pistons are not aligned with the first set of fluid lines to the master cylinder and to the second set of fluid lines to the proportioning valve. The system can be activated when it is in an open position. In order to activate the system, an authorized person depresses the brake pedal of a motor vehicle. This causes pressurization throughout the brakes hydraulic lines. The person will then arm the system through the control panel. The control panel sends an activate signal through the electrical conduits to the reversible drive motor.

The motor will then be activated causing the shaft to rotate. This rotation will provide for the rods and pistons to be extended outwardly into the first and second fluid lines. The rotation of the shaft continues until the cam contacts the first limit switch. Upon contact, the first limit switch sends a signal to the motor. This signal will provide for the motor to stop and thereby cause the first and second check valves in the third and fourth fluid lines to be aligned with the first set of fluid lines to the master cylinder and to the second set of fluid lines to the proportioning valve. The check valves permit the brake fluid to flow in one direction through the third and fourth fluid lines. This will prevent the brake fluid from returning to the master cylinder causing the brakes to be inoperable.

The control panel will permit for an authorized person to disarm the system. This control panel will send a deactivate signal through the electrical conduits to the reversible drive motor. The signal will permit the shaft of the motor to rotate in a reverse direction. This reverse rotation will provide for the cross-bar to rotate in a reverse direction. The rotation of the cross-bar will permit for the first and second pistons to move inwardly via the first and second rods. The rotation continues until the cam contacts the second limit switch. Upon contact, the second limit switch sends a signal to the motor. This signal will provide for the motor to stop and thereby cause the first and second fluid lines to be free from the obstruction of the first and second check valves and thus will permit the brake fluid to return to the master cylinder, thereby providing for normal brake operation.

It is noted that the cross-bar, rods, and pistons form a blockage means.

A visual means, such as LEDs 62 (see FIG. 2), can be utilized on the control panel 58 to indicate if the system is activated or deactivated. An audible means (not illustrated) can also be utilized with the control panel.

In the above-described embodiment, the blockage means can be altered. This alteration is illustrated in further detail in FIG. 4, the third embodiment of the present invention.

As seen in this embodiment, the anti-theft device system 10 of the present invention consists of a housing 12 located between the master cylinder and the proportioning valve (neither illustrated). The housing has a first end and a second end. A first set of brake lines 14 connect the first end of the housing to the master cylinder while a second set of brake lines 16 connect the second end of the housing to the proportioning valve.

The housing includes a hollow interior 64. A first fluid line or fluid channel 44 and a second fluid line or fluid channel 46 are located within the housing. The first fluid line is parallel to the second fluid line and both are aligned with the first set of brake lines and the second set of brake lines. A reversible drive motor is exteriorly attached to the housing while the shaft of the motor extends into the hollow interior of the housing.

Figure 2:
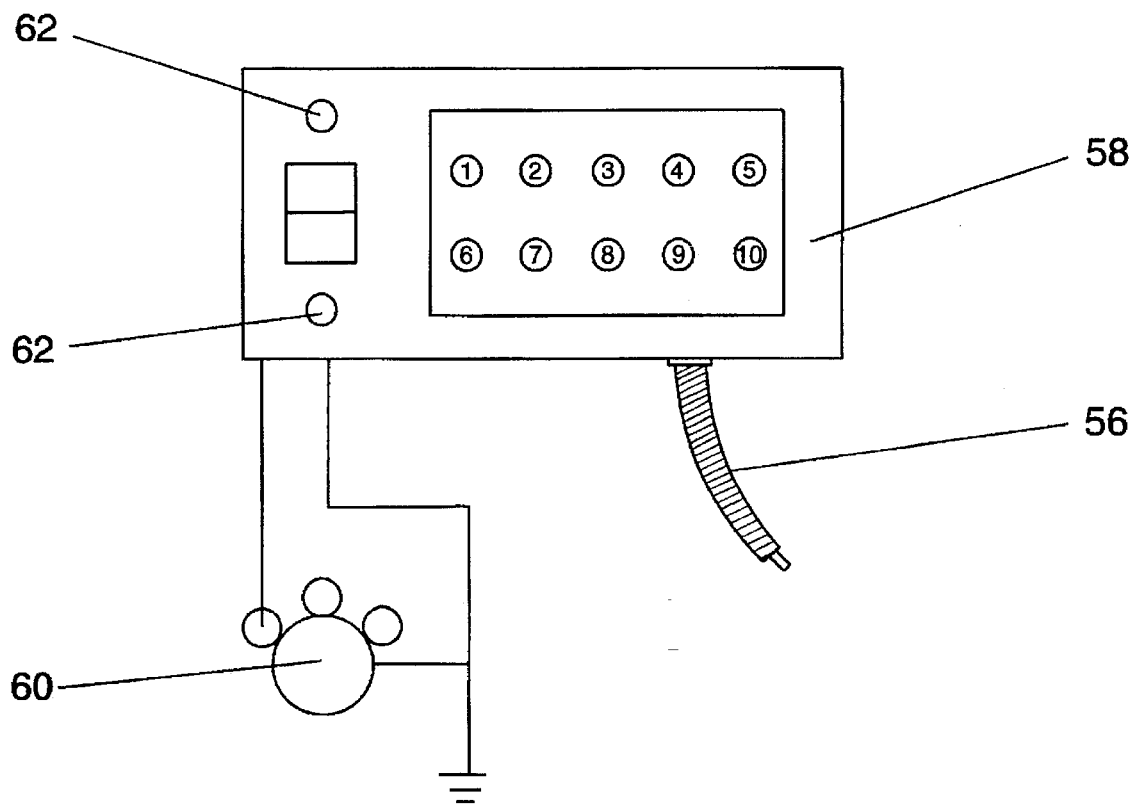
FIG. 2 is a front planar view of the control panel used in the anti-thief system of the present invention.

The reversible drive motor includes a top area 40 and a bottom area 42. Additionally, the reversible drive motor is connected by electrical conduits to a control panel. The control panel is locatable within the vehicle compartment. The control panel is illustrated in FIG. 2.

Rotatably and centrally affixed to the shaft is a smooth oval cam 80. Hydraulic balls 82 are in direct contact with the smooth cam and are held in a secure position by springs 84. A third fluid line 48 and a fourth fluid line 50 are located in the hydraulic balls. A first check valve 52 and a second check valve 54 are situated in the third and fourth fluid lines, respectively.

A cam not illustrated in this figure, but illustrated as 132 in FIG. 1b is centrally attached to the shaft of the reversible drive motor and is located between the oval cam and the housing. A first limit switch not illustrated in this figure, but illustrated as 130a in FIG. 1b is located in the proximity of the top area of the motor while a second limit switch not illustrated in this figure, but illustrated in as 130b in FIG. 1b is located in the proximity of the bottom area of the motor. The first and second limit switches are in electrical communication with the reversible motor.

The system is in an open position when the third and fourth fluid lines are not aligned with the first set of fluid lines to the master cylinder and to the second set of fluid lines to the proportioning valve. The system can be activated when it is in an open position. In order to activate the system, an authorized person depresses the brake pedal of a motor vehicle. This causes pressurization throughout the brakes' hydraulic lines. The person will then arm the system through the control panel. The control panel sends an activate signal through the electrical conduits to the reversible drive motor.

The motor will then be activated causing the shaft to rotate. This rotation will provide for the oval cam to rotate. This causes the oval cam's zenith edges to contact the hydraulic balls causing the hydraulic balls to be extended outwardly. The outward movements cause the springs to compress and enables the third and fourth fluid lines to be aligned with the first and second fluid lines. Rotation of the shaft continues until the cam contacts the first limit switch. Upon contact, the first limit switch sends a signal to the motor. This signal will provide for the motor to stop and thereby cause the first and second check valves in the third and fourth fluid lines to be aligned with the first set of fluid lines to the master cylinder and to the second set of fluid lines to the proportioning valve. The check valves permit the brake fluid to flow in one direction through the third and fourth fluid lines. This will prevent the brake fluid from returning to the master cylinder causing the brakes to be inoperable.

The control panel will permit for an authorized person to disarm the system. The control panel (illustrated in FIG. 2) is connected by an electrical conduit to the motor. This control panel is electrically connected to an ignition switch and is locatable within the vehicle compartment. The control panel will send a deactivate signal through the electrical conduits to motor. The signal will permit the shaft of the motor to rotate in a reverse direction. This reverse rotation will provide for the smooth cam to rotate in a reverse direction. The rotation of the cam will permit for the hydraulic balls move inwardly and provide for the spring to decompress. The rotation continues until the cam contacts the second limit switch. Upon contact, the second limit switch sends a signal to the motor. This signal will provide for the motor to stop and thereby cause the first and second fluid lines to be free from the obstruction of the first and second check-valves. This will permit for the brake fluid to return to the master cylinder, thereby providing for normal brake operation.

It is noted that the smooth cam, hydraulic balls, and springs form a blockage means.

A visual means, such as LEDs 62 (see FIG. 2), can be utilized on the control panel to indicate if the system is activated or deactivated. An audible means (not illustrated) can also be utilized with the control panel.

Figure 5A:
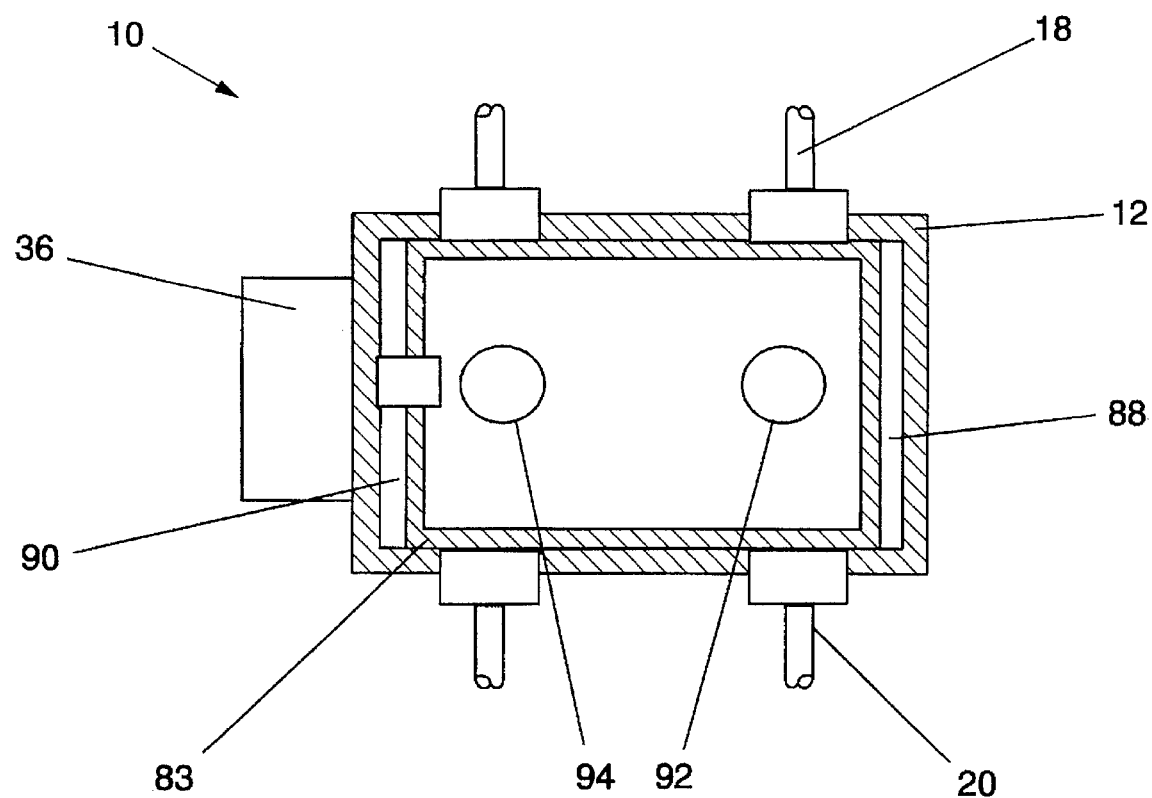
FIGS. 5a–5c are cross-sectional views of the fourth embodiment of the anti-thief system of the present invention.
Figure 5B:
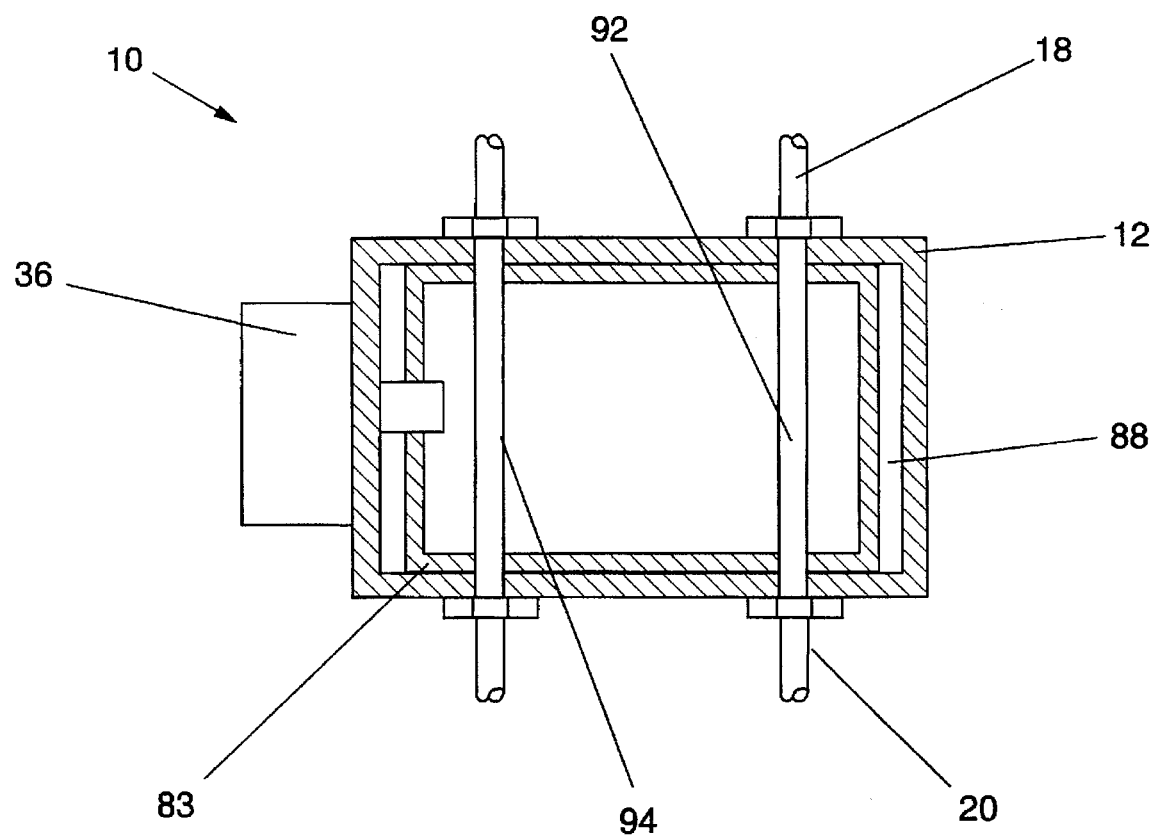
Figure 5C:
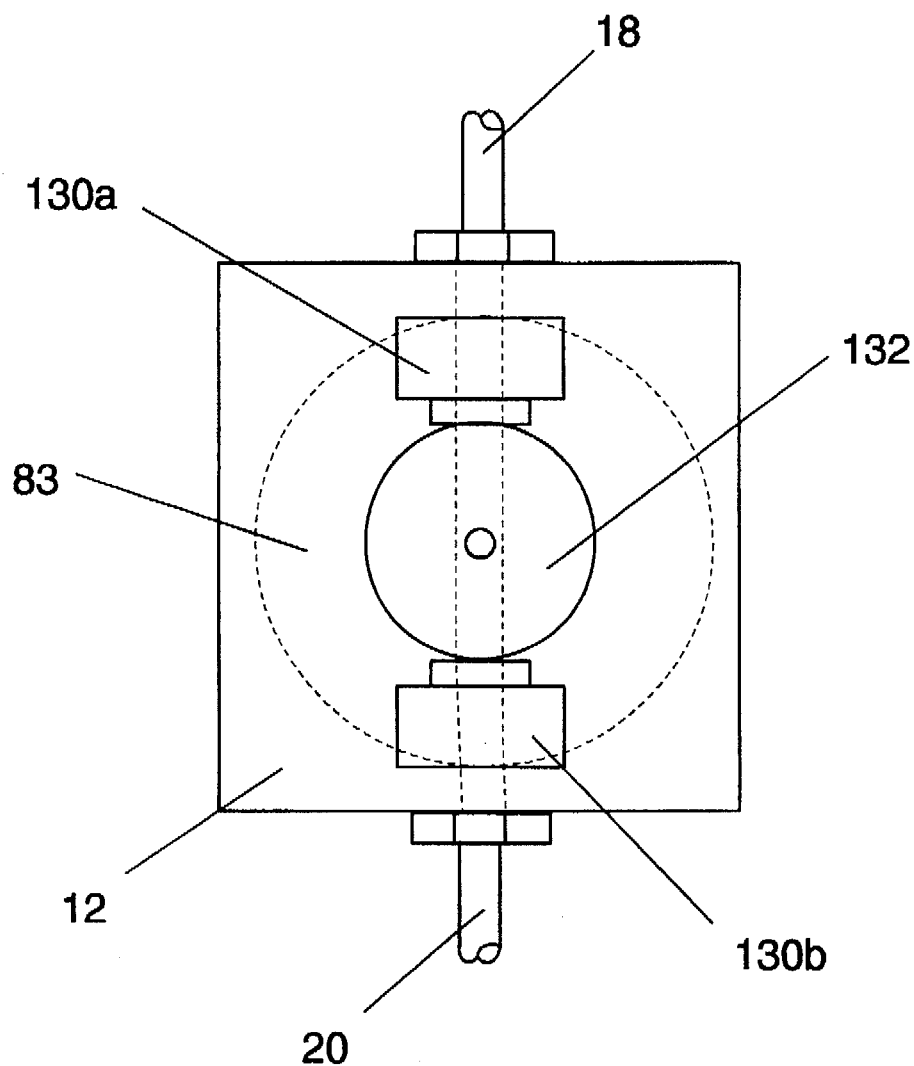

The blocking means of the present invention can be altered to provide for a fourth embodiment of the present invention. This fourth embodiment is illustrated in further detail in FIGS. 5a–5c. The anti-theft device shown in FIG. 5a is the closed position while FIG. 5b is an open position. The fourth embodiment of the anti-theft system 10 of the present invention consists of a housing 12 located between the master cylinder and the proportioning valve (neither illustrated). The housing has a first end and a second end. A first set of brake lines 14 connect the first end of the housing to the master cylinder while a second set of brake lines 16 connect the second end of the housing to the proportioning valve.

The housing includes a hollow interior 64. A first fluid line 92 and a second fluid line 94 are located within the housing. The first fluid line is parallel to the second fluid line and both are aligned with the first set of brake lines and the second set of brake lines when the system is in an open position. A reversible drive motor 36 is exteriorly attached to the housing while the shaft of the motor extends into the hollow interior of the housing.

The reversible drive motor includes a top area and a bottom area. Additionally, the reversible drive motor is connected by electrical conduits to a control panel. The control panel is locatable within the vehicle compartment. The control panel is illustrated in FIG. 2.

Situated in the hollow interior and attached to the shaft is a cylinder 83. The cylinder has a first end and a second end (both not labeled). The first end is in the proximity of the motor and is opposite to the second end. A first seal 88 is located between the second end and the housing while a second seal 90 is located between the first end and the housing.

A cam 132 is centrally attached to the shaft of the reversible drive motor and is located between the cylinder and the housing. A first limit switch 130a is located in the proximity of the top area of the motor while a second limit switch 130b is located in the proximity of the bottom area of the motor. The first and second limit switches are in electrical communication with the reversible motor.

The system is in an open position when the first and second fluid lines are aligned with the first set of fluid lines to the master cylinder and to the second set of fluid lines to the proportioning valve. The system can be activated when it is in an open position. In order to activate the system, an authorized person depresses the brake pedal of a motor vehicle. This causes pressurization throughout the brakes hydraulic lines. The person will then arm the system through the control panel. The control panel sends an activate signal through the electrical conduits to the reversible drive motor.

The motor will then be activated causing the shaft to rotate. This rotation will provide for the cylinder to rotate. Rotation of the shaft continues until the cam contacts the first limit switch. Upon contact, the first limit switch sends a signal to the motor. This signal will provide for the motor to stop and thereby cause the first fluid line and the second fluid line not to be aligned with the first set of fluid lines to the master cylinder and to the second set of fluid lines to the proportioning valve. This arrangement does not permit the fluid to flow from the master cylinder to the proportioning valve, thereby causing the brakes to be inoperable.

The control panel will permit for an authorized person to disarm the system. The control panel (illustrated in FIG. 2) is connected by an electrical conduit to the motor. This control panel is electrically connected to an ignition switch and is locatable within the vehicle compartment. The control panel will send a deactivate signal through the electrical conduits to motor. The signal will permit the shaft of the motor to rotate in a reverse direction. This reverse rotation will provide for the cylinder to rotate in a reverse direction. The rotation of the cylinder will provide for the first and second fluid lines to align with the first and second set of fluid lines. The rotation continues until the cam contacts the second limit switch. Upon contact, the second limit switch sends a signal to the motor. This signal will provide for the motor to stop and thereby cause the first and second fluid lines to be free from the obstruction. Fluid flow can again resume and allow for normal brake operation.

It is noted that the cylinder, the first fluid line, and the second fluid line form a blockage means.

A visual means, such as LEDs 62 (see FIG. 2), can be utilized on the control panel to indicate if the system is activated or deactivated. An audible means (not illustrated) can also be utilized with the control panel.

The control panel includes an activation means, which is illustrated in FIG. 2, can be altered to include a plurality of embodiments. These embodiments are illustrated in FIGS. 6a–6e.

Figure 6A:
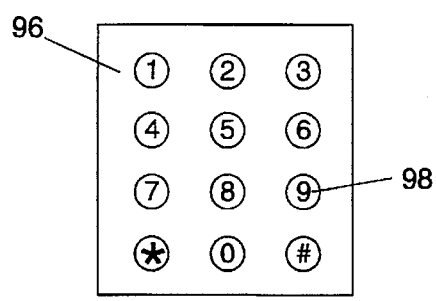
FIGS. 6a–6e are front views of the activation means in the control panel used in the anti-thief system of the present invention.

As seen in FIGS. 2 and 6a, the control panel consists of an alphanumeric keypad 96 locatable within the drivers compartment. The keypad is in electrical communication with the motor. The key pad includes two or more alphanumeric characters 98. Once so programmed the sequence is stored in memory until overridden by programming in a new sequence. In order to activate the system the operator must enter the precise character sequence. The system will check to see if the character combination entered matches the character combination in memory. If a match occurs, the keypad will send an electrical signal to the motor.

Figure 6D:
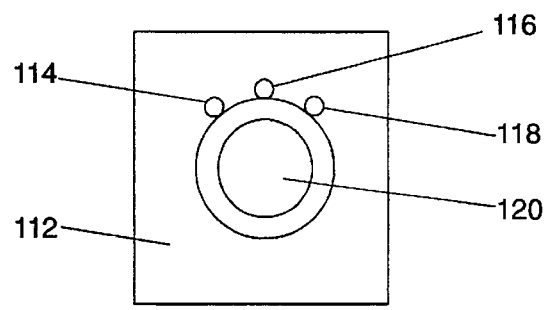
Figure 6B:
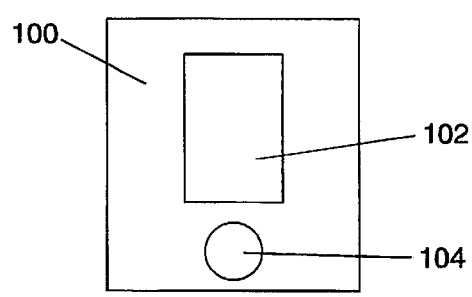
Figure 6E:
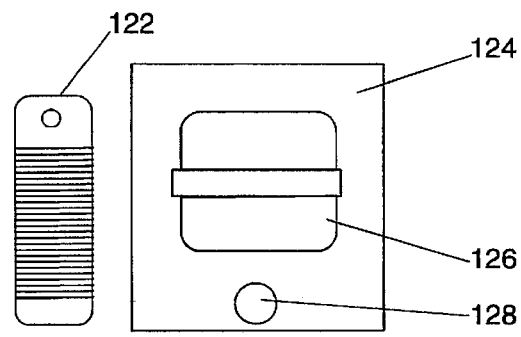

In FIGS. 6b and 6e, the embodiment of the activation means of the control panel consists of a bar code scanner 124 or retinal or thumb print scanner 100. The scanner is programmable to scan either the operators retina or thumb print through a scan window 102 or a specific bar code through another scan window 126 which bar code is locatable on a key chain 122. Once so scanned, the scanned image is retained in memory until overridden by scanning in a mew image. In order to activate the system the operator must scan in the appropriate image. The system will check to see if the image scanned matches the image in memory. If a match occurs, the scanner will send an electrical signal to the motor.

In order to deactivate the system, the operator must once again scan in the appropriate image, which will send an electrical signal to the motor. The retinal or thumb print scanner has an override button 104 and the bar code scanner has an override button 128.

Figure 6C:
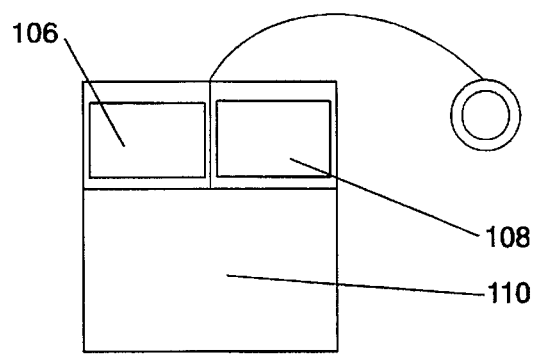

In FIG. 6c, another embodiment of the control panel, the activation means consist of a wireless remote system. A signal box 110 is kept with the operator preferably on the operators key chain. In order to activate the system the operator presses an activate button 106 on the signal box. This will send a radio signal to the system. The system, upon detection of the radio signal will send an electrical signal to the motor.

In order to deactivate the system the operator again presses the deactivate button 108 on the signal box. This will send a radio signal to the system. The system upon detection of the radio signal, will send an electrical signal to the motor.

In FIG. 6d, another embodiment of the control panel, the activation means consist of a key-lock system 112. In order to activate the system the operator inserts the appropriated key into the key cylinder 120 and turns to the on position 114 which will send an electrical signal to the motor. In order to deactivate the system the operator inserts the appropriate key into the key cylinder and turns it to the off position 116 which will send an electrical signal to the motor. An override position 118 is also available.

While the invention has been particularly shown and described with reference to an embodiment thereof, it will be understood by those skilled in the art that various changes in form and detail may be made without departing from the spirit and scope of the invention.

I claim:

1. An anti-theft system which is located between a hydraulic fluid line having a fluid disposed therethrough comprising in combination:

a housing having a first end, a second end, and an interior portion;

said fluid flows through said first end and said second end of said housing when said anti-theft device is in an open position;

a reversible drive motor having a shaft exteriorly attached to said housing;

said reversible drive motor has a top area and a bottom area;

said shaft extends into said interior portion of said housing;

a hollow cylinder is located in said interior portion;
said hollow cylinder includes a first end, a second end, and an encompassing side wall;

a ring gear is internally attached to the encompassing side wall of the hollow cylinder;

a plurality of planetary gears are in contact with the ring gear;

a sun gear is internally attached at said first end of said hollow cylinder to said shaft of said reversible drive motor;
said hollow cylinder is centrally affixed to said shaft of said reversible drive motor;
said sun gear is in direct contact with said plurality of planetary gears;

a cam is centrally attached to said shaft;

a first limit switch is located about said top area of said motor and a second limit switch is located about said bottom area of said motor;
said first limit switch and said second limit switch are in electrical communication with said motor;

at least one fluid line extends across said hollow cylinder;

at least one fluid channel extends across said hollow cylinder;
said fluid channel is perpendicular to said fluid line;
said fluid channel includes a check valve;

said fluid line is aligned with said hydraulic fluid line when said anti-theft system is not activated;

said fluid channel is aligned with said hydraulic fluid line when said anti-theft system is activated;

an electrical conduit electrically connects said motor to a control panel;
said electrical conduit sends an electrical signal to said motor from said control panel;
said control panel permits an authorized person to activate or deactivate said anti-theft system;
wherein once an authorized person activates said anti-theft system said shaft rotates causing said sun gear to rotate, said rotating of said sun gear causes said planetary gears to rotate, rotating of said planetary gears cause said ring gear to rotate, said ring gear provides for said cylinder to rotate, said shaft continues to operate until said cam contacts said first limit switch to permit for said fluid channel to align with said hydraulic fluid line; and wherein once an authorized person deactivates said anti-theft system said shaft rotates reversely causing said sun gear to rotate reversely, said rotating of said sun gear causes said planetary gears to rotate, said rotation of said planetary gears cause said ring gear to rotate, said ring gear provides for said cylinder to rotate, said shaft continues to operate until said cam contacts said second limit switch to permit for said fluid line to align with said hydraulic fluid line.

2. An anti-theft system which is located between a hydraulic fluid line having a fluid disposed therethrough comprising in combination:

a housing having a first end, a second end, and an interior portion;

at least one fluid line extends from said first end to said second end;

said fluid flows through said fluid line when said anti-theft device is in an open position;

a reversible drive motor having a shaft exteriorly attached to said housing;

said reversible drive motor has a top area and a bottom area;

said shaft extends into said interior portion of said housing;

a blocking means is centrally affixed to said shaft of said reversible drive motor;

said blocking means is located in said interior portion;

said blocking means includes at least one fluid channel;

said fluid channel includes a check valve located therein;

said fluid channel is insertable into said fluid line when said anti-theft system is activated;

a cam is centrally attached to said shaft;

a first limit switch is located about said top area of said motor and a second limit switch is located about said bottom area of said motor;

said first limit switch and said second limit switch are in electrical communication with said motor;

an electrical conduit electrically connects said motor to a control panel;

said electrical conduit sends an electrical signal to said motor from said control panel;

said control panel permits an authorized person to activate or deactivate said anti-theft system;

wherein once an authorized person activates said anti-theft system said shaft rotates causing said blockage means to move, rotating of said blocking means causes said fluid channel to be in said fluid line, said shaft continues to operate until said cam contacts said first limit switch to permit for said fluid channel to align with said fluid line; and wherein once an authorized person deactivates said anti-theft system said shaft rotates reversely causing said blockage means to move, moving the said blocking means causes said fluid channel to exit said fluid line, said shaft continues to reversibly rotate until said cam contacts said second limit switch to permit for said fluid channel to exit said fluid line.

3. An anti-theft device as in claim 2 wherein said blockage means further comprises:

a cross-bar;

said cross-bar includes a first end and a second end;

a first rod is pivotally attached to said first end of said cross-bar;

a first piston is oppositely attached from said cross-bar to said first rod;

said fluid channel is located in said first piston;

wherein said activation of said anti-theft system provides for shaft rotation causing said cross-bar to rotate, rotating said cross-bar causes said first rod and said first piston to extend outwardly causing said fluid channel to be in said fluid line, said shaft continues to operate until said cam contacts said first limit switch to permit for said fluid channel to align with said fluid line; and wherein once an authorized person deactivates said anti-theft system said shaft rotates reversely causing said cross-bar to reversely rotate, rotating said cross-bar causes said first rod and said first piston to move inwardly, moving inwardly causes said fluid channel to exit said fluid line, said shaft continues to reversibly rotate until said cam contacts said second limit switch to permit for said fluid channel to exit said fluid line.

4. A anti-theft system as in claim 2 wherein said blocking means comprises:

a oval cam;

said oval cam is rotatably and centrally affixed to said shaft;

a hydraulic ball is in direct contact with said oval cam;

a spring holds said hydraulic ball in a secure position;

said fluid channel is located in said hydraulic ball;

wherein said activation of said anti-theft system provides for shaft rotation causing said oval cam to rotate, rotating said oval cam causes said hydraulic ball to extend outwardly causing said springs to compress and said fluid channel to be in said fluid line, said shaft continues to operate until said cam contacts said first limit switch to permit for said fluid channel to align with said fluid line; and wherein once an authorized person deactivates said anti-theft system said shaft rotates reversely causing said oval cam to rotate, rotating said oval cam causes said hydraulic ball to extend inwardly causing said fluid channel to exit said fluid line, said shaft continues to reversibly rotate until said cam contacts said second limit switch to permit for said fluid channel to exit said fluid line.

5. An anti-theft system which is located between a hydraulic fluid line having a fluid disposed therethrough comprising in combination:

a housing having a first end, a second end, and an interior portion;

a cylinder is located in said interior portion;

at least one fluid line extends through said cylinder;

said fluid flows through said fluid line when said anti-theft device is in an open position;

a reversible drive motor having a shaft exteriorly attached to said housing;

said shaft extends into said housing;

said reversible drive motor has a top area and a bottom area;

said cylinder is attached to said shaft;

a cam is centrally attached to said shaft;

a first limit switch is located about said top area of said motor and a second limit switch is located about said bottom area of said motor;

said first limit switch and said second limit switch are in electrical communication with said motor;

an electrical conduit electrically connects said motor to a control panel;

said electrical conduit sends an electrical signal to said motor from said control panel;

said control panel permits an authorized person to activate or deactivate said anti-theft system;

said cylinder has a first end and a second end;

a first seal is located at said first end and a second seal is located at said second end;

wherein said activation of said anti-theft system provides for shaft rotation causing said cylinder to rotate, rotating said cylinder causes said fluid line to move, said shaft continues to operate until said cam contacts said first limit switch to permit for said fluid not to flow; and wherein once an authorized person deactivates said anti-theft system said shaft rotates reversibly causing said cylinder to reversely rotate, said shaft continues to reversibly rotate until said cam contacts said second limit switch to permit for said fluid line to align with said hydraulic fluid line.

* * * * *